United States Patent
Fersterer

(10) Patent No.: US 12,458,374 B2
(45) Date of Patent: Nov. 4, 2025

(54) PERFORATOR

(71) Applicant: ADEOR MEDICAL AG, Valley (DE)

(72) Inventor: Johann Fersterer, Valley (DE)

(73) Assignee: ADEOR MEDICAL AG, Valley (DE)

( * ) Notice: Subject to any disclaimer, the term of this patent is extended or adjusted under 35 U.S.C. 154(b) by 485 days.

(21) Appl. No.: 17/916,638

(22) PCT Filed: Apr. 1, 2021

(86) PCT No.: PCT/EP2021/058611
§ 371 (c)(1),
(2) Date: Oct. 3, 2022

(87) PCT Pub. No.: WO2021/198418
PCT Pub. Date: Oct. 7, 2021

(65) Prior Publication Data
US 2023/0149029 A1 May 18, 2023

(30) Foreign Application Priority Data
Apr. 3, 2020 (GB) ..................... 2004975

(51) Int. Cl.
*A61B 17/16* (2006.01)
*A61B 90/00* (2016.01)

(52) U.S. Cl.
CPC ...... *A61B 17/1695* (2013.01); *A61B 17/1615* (2013.01); *A61B 2090/035* (2016.02)

(58) Field of Classification Search
CPC ............ A61B 17/1695; A61B 17/1615; A61B 2090/035
See application file for complete search history.

(56) References Cited

U.S. PATENT DOCUMENTS

| | | | | |
|---|---|---|---|---|
| 2,525,669 A * | 10/1950 | Hainault | ............ | A61B 17/1695 408/140 |
| 2,842,131 A * | 7/1958 | Smith | ................ | A61B 17/1695 408/139 |
| 4,319,577 A * | 3/1982 | Bofinger | ............ | A61B 17/1695 279/905 |
| 4,456,010 A * | 6/1984 | Reimels | ................. | B23B 51/10 408/139 |
| 4,951,690 A * | 8/1990 | Baker | ................ | A61B 17/1695 128/898 |

FOREIGN PATENT DOCUMENTS

| | | |
|---|---|---|
| EP | 3287083 A1 | 2/2018 |
| WO | 2009021933 A1 | 2/2009 |
| WO | 2015/150844 A1 | 8/2015 |

* cited by examiner

*Primary Examiner* — Kevin T Truong
*Assistant Examiner* — Diana Jones
(74) *Attorney, Agent, or Firm* — DINSMORE & SHOHL LLP

(57) ABSTRACT

A perforator for drilling bone tissue has: a drive shaft with a rotational axis A; an inner cutting head with the same rotational axis A; a drive surface provided on the drive shaft; and a connector provided on the inner cutting head. The inner cutting head is displaceable with respect to the drive shaft along the rotational axis between a distal position, in which the inner cutting head is not driveable by the drive shaft, and a proximal position, in which the drive surface abuts the connector to transmit rotational motion from the drive shaft to the inner cutting head. The drive surface is inclined relative to the rotational axis A.

22 Claims, 7 Drawing Sheets

1. Negative exponential
2. Negative logarithmic
3. S-curve
4. Linear
5. Positive logarithmic
6. Positive exponential

PERFORATOR

CROSS-REFERENCE TO RELATED APPLICATIONS

This application is the U.S. National Stage of PCT/EP2021/058611 filed on Apr. 1, 2021, which claims priority to United Kingdom Patent Application 2004975.5 filed on Apr. 3, 2020, the entire content of both are incorporated herein by reference in their entirety.

FIELD OF THE INVENTION

The present invention relates to a perforator for drilling bone tissue. More particularly, the invention relates to a cranial perforator, or a cranial drill, for use by medical practitioners in operations performed on the skull of a human or animal.

BACKGROUND OF THE INVENTION

In order to carry out surgical operations inside the cranial cavity, it is necessary to first obtain access to the cranial cavity by drilling one or more holes through the bone of the skull (the cranium). The process of drilling a hole through the skull is called trepanation. Trepanation is a difficult and delicate procedure, as sufficient force must be applied to the drill head to advance through the hard layers of bone tissue, but the drill head must be halted immediately after perforation of the skull in order to avoid the drill head damaging the dura mater inside the cranium.

In order to provide a solution which stops the rotation of the drill head as soon as the cranium has been perforated, cranial perforators are provided in the prior art in which the drill head is not permanently coupled to the drive shaft of the drill.

A well-known example of a prior art design is disclosed in U.S. Pat. No. 4,456,010. The drill of U.S. Pat. No. 4,456,010 comprises an inner drill head, an outer drill head arranged coaxially around the inner drill head, and a drive shaft, all rotatable about the same axis of rotation. The inner drill head is biased away from the drive shaft with a spring, so that when there is no pressure applied to the tip of the inner drill head, the drill head and the shaft are disconnected, and neither of the inner or outer drill heads rotates even when the drive shaft is rotating. Connection of the inner drill head to the drive shaft is controlled using a slot-and-pin type clutch that comprises a slot in the distal end of the drive shaft, and a corresponding pin in the proximal end of the drill head. The clutch-pin also extends into a triangular slot in the wall of the outer drill head.

As the inner drill head of U.S. Pat. No. 4,456,010 is pressed against bone in use, a force is applied which moves the inner drill head against the biasing spring until the pin in the inner drill head engages with the slot in the rotating drive shaft. In this position, the pin in the inner drill head also engages with the apex of the triangular slot, so that rotational force is transmitted from the inner drill head to the outer drill head, and both drill heads rotate together. As long as force is applied to the tip of the inner drill head to keep the pin engaged with the slot, the rotating drive shaft transmits rotational force to the drill heads so that both drill heads rotate and the perforator drills through the bone. As soon as the inner drill head perforates the inner surface of the cranium, however, force is no longer applied to the drill head by the bone, so the biasing spring urges the pin out of the slot in the drive shaft. Both the inner and outer drill heads should then cease to rotate immediately, to prevent damage to the dura mater.

While the clutch-slot in the drive shaft of U.S. Pat. No. 4,456,010 was a square-sided slot, with the slot walls aligned with the axis of rotation, other prior art variations of this design have instead used semi-circular slot profiles to provide a close fit for cylindrical pins. The present inventors have found, however, that a shortfall of both of these designs is the presence of a sharp trailing edge on the slots.

In these prior art perforator designs it cannot be guaranteed that the release mechanism in the perforator always separates immediately. It can happen that the pin gets stuck at the sharp edge of the slot when the pressure on the inner drill head ceases and the pin should be released. This can cause damage to the pin or the slot edge, which is disadvantageous for further drilling and in the worst case can result in the clutch not being released in time. Overall, this sharp edge means that it is difficult to ensure safe uncoupling of the rotating drive shaft from the drill heads.

Furthermore, the slot in the drive shafts of the prior art is typically very narrow, which delays engagement at the start of drilling as it is difficult for the pin to locate the slot. In the design of U.S. Pat. No. 4,456,010, for example, the coupling can only take place at 0° or 180°. Only with increasing axial pressure does the pin engage in the slot of the drive shaft, by which time the drive has already picked up speed. Coupling in this form has two disadvantages: (i) the user feels an unpleasant chattering as the driving portion engages; and (ii) the release mechanism can be damaged at the start of drilling as the pin passes over the sharp groove edge.

Other attempts have been made in the prior art to improve the clutch mechanism of the U.S. Pat. No. 4,456,010 perforator.

One such attempt was made in WO2015/150844A1, which replaced the slot-and-pin clutch of U.S. Pat. No. 4,456,010 with two square-sided first connecting profiles on the proximal end of the drill head, and two square-sided second connecting profiles on the distal end of the drive shaft. Both the first and second connecting profiles are designed to generate lines that are parallel to the rotational axis of the perforator, so when the drill head engages the drive shaft, the flat connecting profiles are in continuous contact over a connection length determined by the height of the connecting profiles. This creates the result that the drill head does not disconnect from the drive shaft as long as the distal displacement of the drill head does not exceed the connection length. However, the square-sided connection profiles of WO2015/150844A1 still retain the sharp trailing edge present on the square slot of the U.S. Pat. No. 4,456,010 design, and therefore are liable to suffer from the same problems described above.

SUMMARY OF THE INVENTION

The invention provides a perforator as defined herein, to which reference should now be made. Preferred or advantageous features of the invention are described herein.

In a first aspect, the invention provides a perforator for drilling bone tissue, comprising:
a drive shaft with a rotational axis A;
an inner cutting head with the same rotational axis A;
a drive surface provided on the drive shaft;
and a connector provided on the inner cutting head;
in which the inner cutting head is displaceable with respect to the drive shaft along the rotational axis between a distal position, in which the inner cutting head is not driveable by the drive shaft, and a proximal position, in which the drive surface abuts the connector to transmit rotational motion from the drive shaft to the inner cutting head,
in which the drive surface is inclined relative to the rotational axis A.

The perforator may alternatively be termed a cranial perforator, or a drill, and is preferably attachable to a drill body, for example a hand-held drill, so that the perforator acts as the "drill bit" for drilling bone tissue.

The term "distal" refers herein to portions of the perforator positioned towards the drilling tip of the perforator, which is intended to contact the bone tissue in use, while the term "proximal" refers to portions that are further from the bone being drilled and closer to, for example, the hand of the user holding the drill.

The arrangement and function of the inner and outer cutting heads may be generally similar to the perforators of U.S. Pat. No. 4,456,010 and WO2015/150844A1. As in the prior art designs, the inner cutting head is configured to engage and disengage with the drive shaft by translational movement along the axis of rotation. The inner cutting head comprises a distal tip which forms the distal end of the entire perforator. The inner cutting head is biased into its distal position by a biasing means such as a spring, so that when no pressure is applied to the distal tip of the inner cutting head, the cutting heads are disengaged from the drive shaft. When pressure is applied to the distal end of the inner cutting head, however, the inner cutting head is translated towards its proximal position, so that the connector engages with the drive shaft and abuts the drive surface. When the connector abuts the drive surface and the drive shaft rotates, rotational force is transmitted from the rotating drive shaft to the inner cutting head.

As soon as the pressure on the distal tip of the inner cutting head is removed, for example when the tip perforates a layer of bone, the pressure maintaining the inner cutting head in its proximal position is removed, and the inner cutting head is translated towards its distal position so that the connector disengages from the drive surface and the drive heads stop rotating.

The present invention may be applied to perforator embodiments which have only one cutting head. Thus the inner cutting head may simply be termed the cutting head, or the drill head. In other embodiments, however, the perforator may comprise a second "outer" cutting head or drill head, arranged coaxially around the inner cutting head.

The perforator preferably also comprises an outer cutting head arranged coaxially around the inner cutting head, with the same rotational axis A. The perforator is preferably configured so that, when the inner cutting head is in the proximal position, rotational motion is transmitted to both the inner cutting head and the outer cutting head.

The inner and outer cutting heads are preferably connected by coupling means that is configured so that, when the inner cutting head is in the proximal position, the two cutting heads are coupled together, and any rotational motion from the drive shaft is transmitted to both the inner and outer cutting heads, which rotate together around the rotational axis A. When the inner cutting head moves towards its distal position and the connector disengages from the drive surface, no rotational force is transmitted to either drive head, so both the inner and outer cutting heads stop rotating.

The perforator of the present invention differs from the prior art in particular with respect to the drive surface provided on the drive shaft.

Preferably the drive surface is provided on a distal end of the drive shaft. Preferably the connector is provided on or near a proximal end of the inner cutting head. Functionally, it is important that the drive surface and the connector must be arranged so that when the inner cutting head is in its proximal position, the drive surface abuts the connector to transmit rotational motion from the drive shaft to the inner cutting head.

As set out in the background section above, the perforators of the prior art have typically used drive surfaces that extend "vertically" parallel to the axis of rotation. The reason for this is that a "vertical" drive surface imparts the maximum rotational force vector to the pin, or connecting profile, of the inner drill head.

In the perforator of the present invention, rather than being parallel to the rotational axis, the drive surface is inclined, or sloped, relative to the rotational axis A. Preferably the drive surface is flat and inclined relative to the rotational axis A, at least at the position at which the drive surface abuts the connector. In preferred embodiments, the drive surface is a sloped wall of a groove or slot in the distal end of the drive shaft. Preferably no part of the drive surface is parallel to the rotational axis A. The drive surface in the present invention is not the surface of a semi-circular groove.

The slope of the inclined drive surface means that the rotational force of the drive shaft is applied to the connector through the normal of the drive surface as two vector components: a rotational component in the direction of rotation, and also a translational force component directed in the distal direction. This means that when the connector abuts the inclined drive surface, as well as the desired vector of rotational force being transmitted to the connector, some of the rotational force also urges the connector in a distal direction. In the prior art, this would have been considered undesirable, as instead of transmitting the maximum rotational force to the connector, a component of the drive shaft's rotational force is being "lost" in the form of the distal vector component.

The inventors of the present invention have found, however, that the use of an inclined drive surface improves the reliability with which the connector is released from the distal end of the drive shaft. One reason for this is that the inclined slope of the drive surface also reduces the "sharpness" of the edge between the drive surface and the distal end of the drive shaft, and therefore reduces the likelihood of the connector catching on the edge when the inner cutting head is disengaging from the drive shaft. Another reason for this is that the distal vector of the rotational force urges the connector in a distal direction, and therefore assists with disengagement when the pressure on the inner cutting head is reduced.

The drive surface is inclined so that, moving from the proximal end of the drive surface to the distal end, the drive surface slopes away from the direction of rotation. In other words, as the drive shaft rotates around the rotational axis A, the proximal end of the inclined drive surface leads the distal end of the drive surface.

The inclined drive surface may lie on a virtual helical surface extending around the rotational axis A. As the inclined drive surface slopes away from the direction of rotation, the virtual helical surface extends around the axis in the opposite direction from the direction of rotation. Viewed from the distal end of the perforator, if the direction of rotation of the drive shaft is clockwise, the virtual helical surface defining the drive surface is anti-clockwise.

Preferably the drive surface is sloped at an angle of between 5° and 30°, preferably between 8° and 20°, particularly preferably between 10° and 15° with respect to the rotational axis A. At least the portion of the drive surface which abuts the connector in its proximal position is preferably inclined at an angle in this range. In a particularly preferred embodiment, the drive surface is sloped at an angle of 10° with respect to the rotational axis A (10° relative to the "vertical"). The inventors have found that drive surfaces inclined at these angles advantageously apply the majority of the drive shaft's rotational force to the connector as rotational force which is required for drilling, while also exhibiting improved reliability in the disengagement of the connector from the drive surface.

The drive surface is the portion of the drive shaft which abuts the connector when the inner cutting head is in its proximal position. The drive shaft may extend between a proximal end nearest the proximal end of the drive shaft, and a distal end nearest the distal end of the drive shaft, while between these ends the drive surface comprises an inclined surface against which the connector abuts when the inner cutting head is in its proximal position.

The distal end of the drive surface may be connected to a flat distal end surface of the drive shaft. Due to the inclined angle of the drive surface, the angle between the flat distal end surface and the drive surface should always be greater than 90°, to avoid the "sharp" 90° edge over which the connector has to pass to disengage in the prior art. Preferably the angle between the flat distal end surface and the drive surface is at least 95°, particularly preferably 100° or more, for example 105° or 110°. The larger the angle between the distal end surface of the drive shaft and the drive surface, the less sharp the edge over which the connector must pass to disengage. However, the larger the angle of the drive surface, the smaller the vector component of rotational force that is transmitted from the drive shaft to the cutting heads. The inventors have found that these considerations must be balanced, and that particularly good performance is obtained when the drive surface is inclined at an angle of between 10° and 15° from the rotational axis, so that the angle between the flat distal end surface and the drive surface is between 100° and 105°.

Many prior art designs, such as the perforator of WO2015/150844A1, taught that it was desirable to have a large contact area between the drive surface and the connection profile on the drill head, for example to ensure that drive is still transmitted to the drill head with the drill head in a range of translational positions. Likewise, perforator designs with semi-circular grooves designed to perfectly fit cylindrical pins rely on large contact areas between the groove and the pin, through which rotational force can be transmitted to the drill head.

In the perforator of the present invention, however, the connector is preferably configured to engage with the drive surface by abutting the drive surface along a line of contact when the inner cutting head is in the proximal position. While the connector may abut other parts of the drive shaft when it is in its proximal position, there is preferably only a single line of contact between the connector and the inclined drive surface. Compared to the large 2-dimensional contact areas of WO2015/150844A1, for example, providing a single line of contact between the connector and the inclined drive surface may allow the connector to disengage more quickly and reliably from the drive shaft.

A single line of contact between the connector and the drive surface may be achieved in a variety of ways, for example, by abutting a curved surface with a flat surface, or a first curved surface with a second curved surface having a different radius of curvature.

In some preferred embodiments the connector may comprise a curved connector surface having a radius of curvature R, the curved connector surface being configured to abut the drive surface when the inner cutting head is in the proximal position, so that the curved surface contacts the inclined drive surface along a single line of contact.

In a preferred embodiment, the connector comprises a pin, preferably a cylindrical pin having a radius R.

Particularly preferably, the connector and the drive surface are configured so that the line of contact is spaced from the distal end of the drive shaft. Thus, when the inner cutting head and the connector are in the proximal position, the connector abuts the drive surface at a position on the drive surface that is spaced from the distal end of the drive shaft. This means that rotational force is not transmitted through the edge between the drive surface and the end of the drive shaft, which decreases the likelihood of damage to that edge and decreases the likelihood of the connector failing to disengage from the edge.

Preferably the connector and the drive surface are configured so that the line of contact is spaced at least 0.2 mm, or 0.3 mm, or 0.4 mm from the distal end of the drive surface. Having the line of contact spaced 0.3 mm from the distal end of the drive surface would mean that with the inner cutting head in the proximal position, the connector abuts the drive surface 0.3 mm proximal to the end surface of the drive shaft.

In order to achieve this, the drive surface may have a length that is greater than the radius R of curvature of the connector. If the length of the drive surface is longer than the radius R of a cylindrical pin connector, for example, when the connector is in the proximal position the line of contact between the connector and the drive surface may be advantageously spaced from distal end of drive shaft.

The drive surface may form a first sloped side of a groove formed radially in the distal end of the drive shaft. The second side of the groove is preferably sloped in the opposite direction relative to the rotational axis A. In this embodiment, when the drive shaft is rotating about axis A in the direction used during drilling, the drive surface forms the trailing edge of the groove, while the second side of the groove forms the leading edge of the groove.

The second side of the groove is preferably sloped at a greater angle than the drive surface, relative to the rotational axis A. Thus the second side of the groove may act as a sloped, or ramped "lead-in" to the groove. This may advantageously help to locate the connector in the groove and against the drive surface when the drive shaft is rotating and the inner cutting head is being biased in a proximal direction. This may advantageously help to solve the problem of "chattering" experienced in prior art designs where connector pins failed to locate easily in drive shaft slots.

In preferred embodiments, the second side of the groove is sloped at an angle of between 50° and 85°, preferably between 55° and 80°, particularly preferably between 60° and 75° with respect to the rotational axis A.

The depth of the groove may preferably be greater than the radius R of the connector, so that the line of contact between the drive surface and the connector is spaced from the edge of the groove.

The inventors have found that the slope-angles of the inclined drive surface and the sloped second side of the groove impact on the release point of the connector from the drive surface. The inclined drive surface and the sloped second side of the groove may have an angular separation of between 55° and 115°, preferably between 65° and 100°, particularly preferably between 70° and 85°. For example, if the drive surface is at 10° from the axis of rotation, and the leading edge of the groove is 60° from the axis of rotation A, then the angular separation of the two is 70°. Alternatively, if the drive surface is sloped at 10° from the axis of rotation, and the leading edge is 75° from the axis of rotation A, then the angular separation of the two is 85° in the plane.

Similarly to the prior art designs, the perforator may comprise more than one connector and drive surface, for example two connectors and two drive surfaces. For example, the drive shaft may be rotationally symmetrical and comprise two drive surfaces, spaced 180° apart around the circumference of the drive shaft. Likewise, the inner cutting head may comprise two connectors spaced 180° apart around the circumference of the drive shaft.

In embodiments of the perforator having two drive surfaces spaced 180° apart around the drive shaft, each groove should preferably be as wide as possible to provide a long lead-in slope for the connector. As the drive surface side of the groove is relatively steeply inclined, the second side of the groove preferably extends around a portion of the circumference of the drive shaft to provide a long lead-in slope for the connector. In preferred embodiments, for example, the second side of the groove may extend an angular distance of between 90° and 156° around the circumference of the drive shaft, preferably between 110° and 150°, particularly preferably between 130° and 145° around the circumference.

In preferred embodiments of the groove, the drive surface may be configured so that the second side of the groove is connected to the drive surface (the first side of the groove) by a continuously curved section with a radius of curvature r. This curved section may form the base of the groove.

Preferably, the radius of curvature r of the base of the groove is smaller than the radius of curvature R of the connector. This may advantageously prevent the connector from engaging the drive surface over a large contact area, and ensure that the connector abuts the drive surface along a line of contact only. This may mean that when connector is engaged with the groove, a proximal portion of the connector abuts the base of the groove at a first contact point, or line of contact, to prevent further proximal translation of the connector, and a side portion of the connector abuts the drive surface at a line of contact through which rotational force is transmitted from the drive shaft to the connector.

In preferred embodiments, he radius R of the connector surface is between 10% and 35% greater than the radius r of curvature of the groove, preferably between 15% and 30% greater, particularly preferably between 20% and 25% greater. For example, in a particularly preferred embodiment, the radius of curvature r of the base of the groove is 1 mm, while the radius R of the connector pin is 1.25 mm.

Preferred embodiments of the invention comprise an outer cutting head arranged coaxially around the inner cutting head, rotation of the outer cutting head being driven only when the inner cutting head is in its proximal position.

A coupling means may be provided between the inner cutting head and the outer cutting head, so that when the inner cutting head is in the proximal position both cutting heads are coupled together and rotate simultaneously. Preferably, the outer cutting head comprises an outer coupling portion configured to couple with an inner coupling portion provided on the inner cutting head when the inner cutting head is in the proximal position, so that rotational motion is transmitted from the inner cutting head to the outer cutting head.

Preferably, the coupling means is configured to transform relative rotation of the inner and outer cutting heads around the rotational axis A into translational displacement. For example, one of the inner or outer coupling portions may comprise an angled edge configured to transform relative rotation of the inner and outer cutting heads into translational displacement of the inner cutting head along the rotational axis.

The use of an angled edge in the coupling means may be particularly beneficial, as it advantageously assists with the disengagement of the connector from the drive surface when the pressure on the tip of the cutting head is reduced. Together with the inclined drive surface, this may advantageously provide more reliable disengagement of the cutting heads from the drive shaft.

When the distal tip of the inner cutting head first perforates through the far side of the bone being drilled, the inner cutting head suddenly experiences much less frictional resistance to its rotation, while the torque applied by the drive shaft remains constant and the outer cutting head is still experiencing the same resistance as it is still in contact with bone. This results in the inner cutting head trying to accelerate relative to the outer cutting head, which creates relative rotation between the two cutting heads. The angled edge in the coupling means, however, means that a vector component of this acceleration acts to force the inner cutting head towards its distal position, which therefore assists with the disengagement of the connector from the drive shaft.

The inner coupling portion may be a pin, and the outer coupling portion may be a groove or opening in a wall of the outer cutting head. The groove or opening preferably has a proximal end for receiving the pin when the inner cutting head is in its proximal position, and an angled edge for guiding the pin towards its distal position in response to relative rotation of the inner and outer cutting heads.

The components of the coupling means may alternatively be reversed so that the angled edge is provided on the inner cutting head and the pin is provided on the outer cutting head.

In preferred embodiments, the connector acts as the inner coupling portion. The connector may comprise a cylindrical pin which extends radially out of the inner cutting head. The outer coupling portion may be, for example, an angled slot opening through the wall of the outer cutting head, arranged so that when the perforator is assembled the end of the connector protrudes through the slot.

The angled edge may have an angle of between 10° and 45°, preferably between 15° and 30° with respect to the rotational axis A. The angle of the angled edge will affect the vector component of force that urges the connector towards its distal position, and will therefore affect the disengagement behaviour of the perforator.

The inventors of the present invention have found that the angle of inclination of the drive surface interacts with the angle of the angled edge in the coupling means, to together define the release point at which the connector disengages with the drive shaft. Preferably the drive surface may be inclined at an angle of between 5° and 15°, preferably 10°, relative to the rotational axis A, and the angled edge of the coupling portion is inclined at an angle of between 10° and 30° relative to the rotational axis. The angular separation of the drive surface and the angled edge of the outer coupling portion may be between 15° and 60°, preferably between 20° and 40°, particularly preferably between 25° and 30°.

In preferred embodiments of the perforator, the connector acts as the inner coupling means, and the angled edge is an edge of an opening through the wall of the outer cutting head. Particularly preferably, the drive surface may be inclined at an angle of between 5° and 15°, preferably 10°, relative to the rotational axis A, and the angled edge of the outer coupling portion is inclined in the opposite direction to the drive surface and has an angle of between 15° and 30° relative to the rotational axis.

Another important factor for preventing damage to the perforator during disengagement is the hardness of the connector. Preferably is formed from a material having a hardness that is equal to or greater than the hardness of the drive surface and the angled edge of the coupling means. This may advantageously ensure that the connector is not easily damaged during engagement and disengagement, and avoid potential problems caused by damage to the connection mechanism.

The hardness specifications of the perforator components are given in HRC (Hardness Rockwell C) according to EN ISO 6508-1.

In prior art designs, the connector pin had a hardness of 47 HRC. This was 7 HRC less than the hardness of the complementary parts, for example the drive surface.

The inventors of the present invention have found that a connector of at least the same hardness as the drive surface and the angled edge of the cutting means is significantly more reliable, as the connector is not deformed or damaged during use.

In the present perforator, the connector and the drive surface are preferably formed from the same material. Particularly preferably, the connector may have a hardness of to 54 HRC, which is preferably the same hardness as the drive shaft and the outer cutting head.

According to a second aspect, the invention may provide a perforator for drilling bone tissue, comprising:
a drive shaft with a rotational axis A;
an inner cutting head with the same rotational axis A;
a drive surface provided on the drive shaft;
and a connector provided on the inner cutting head;
in which the inner cutting head is displaceable with respect to the outer cutting head along the rotational axis between a distal position, in which the inner cutting head is not driveable by the drive shaft, and a proximal position, in which the drive surface abuts the connector to transmit rotational motion from the drive shaft to the inner cutting head,
in which the connector is formed from a material having a hardness that is equal to or greater than the hardness of the drive surface.

As described in relation to the first aspect, the perforator preferably comprises an outer cutting head arranged coaxially around the inner cutting head, and the perforator preferably comprises a coupling means comprising an angled edge configured to transform relative rotation of the inner and outer cutting heads into translational displacement of the inner cutting head along the rotational axis. The angled edge is preferably provided on the outer cutting head.

The connector is preferably formed from a material having a hardness that is equal to or greater than the hardness of the angled edge of the outer cutting head.

The features described above in relation to the first aspect of the invention are equally applicable to the second aspect of the invention.

According to a third aspect, the invention may provide a drive shaft for a perforator for drilling bone tissue, the drive shaft having a rotational axis A and comprising a drive surface provided on the drive shaft, in which the drive surface is inclined relative to the rotational axis A.

The drive shaft is preferably a drive shaft for a perforator according to the first or second aspects of the invention.

The features of the drive shaft and the perforator described above in relation to the first and second aspects of the invention are equally applicable to the third aspect of the invention.

BRIEF DESCRIPTION OF THE DRAWINGS

Specific embodiments of the invention will now be described with reference to the figures, in which.

DETAILED DESCRIPTION OF THE INVENTION

Figure 1:
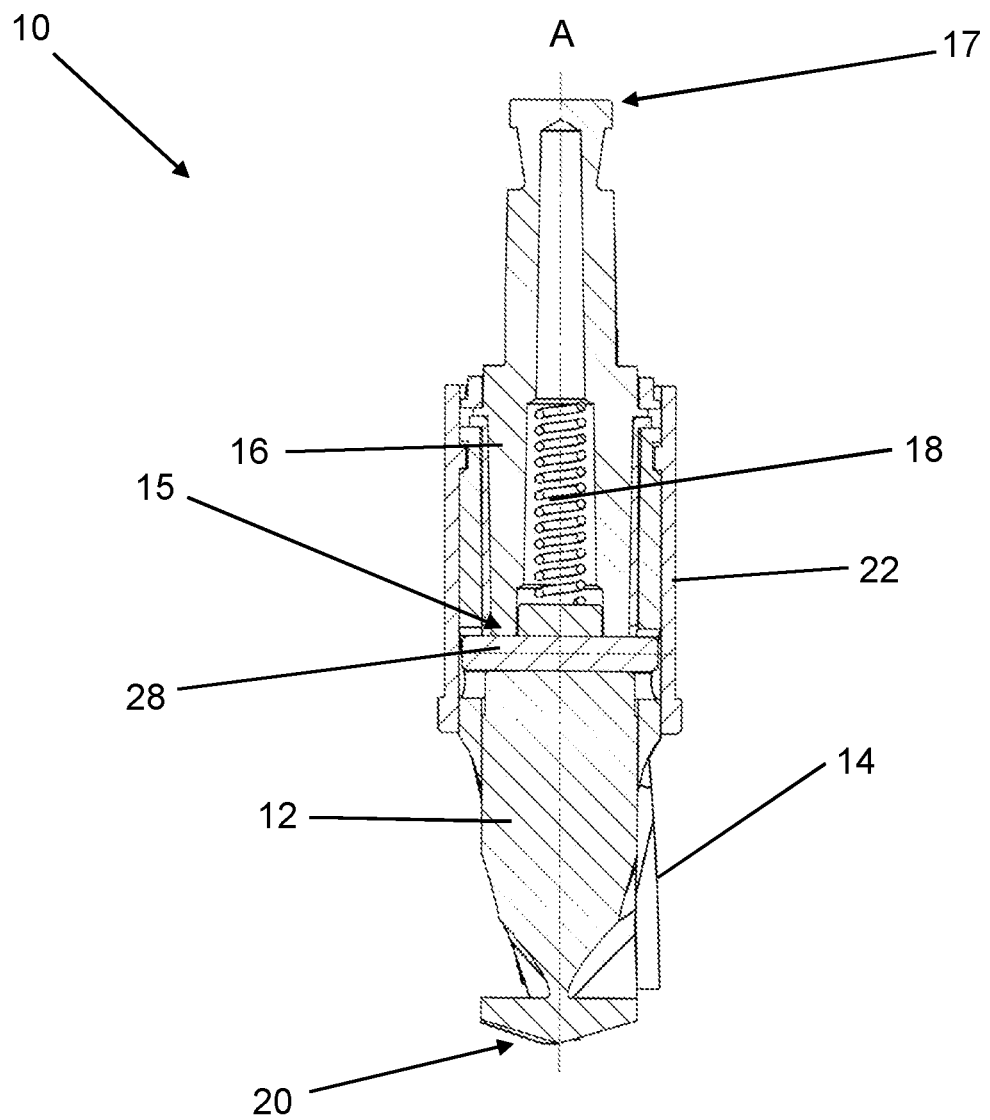
FIG. 1 is a cross-section taken along the rotational axis A of a perforator, for example a perforator according to the prior art.
Figure 2:
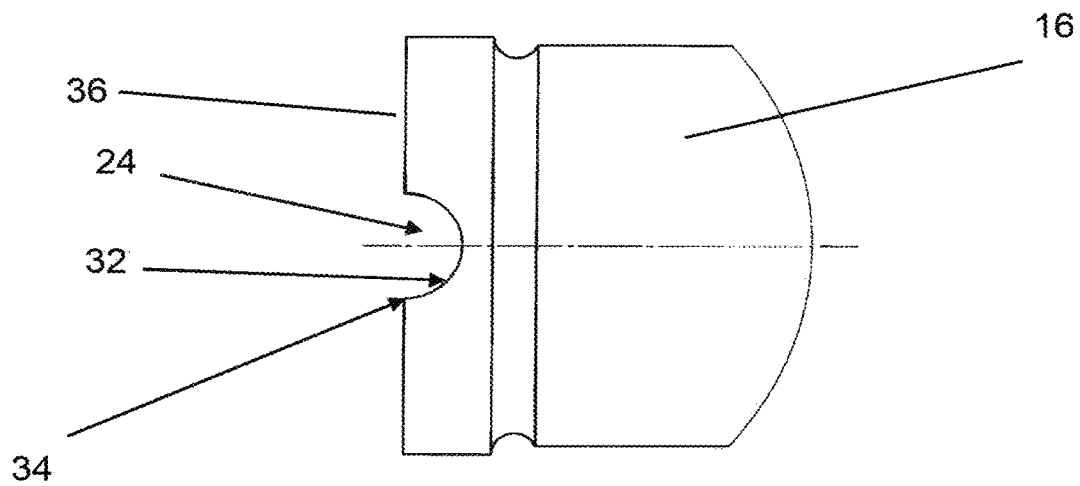
FIG. 2 is a side-on view of the distal end of a prior art drive shaft.
Figure 3:
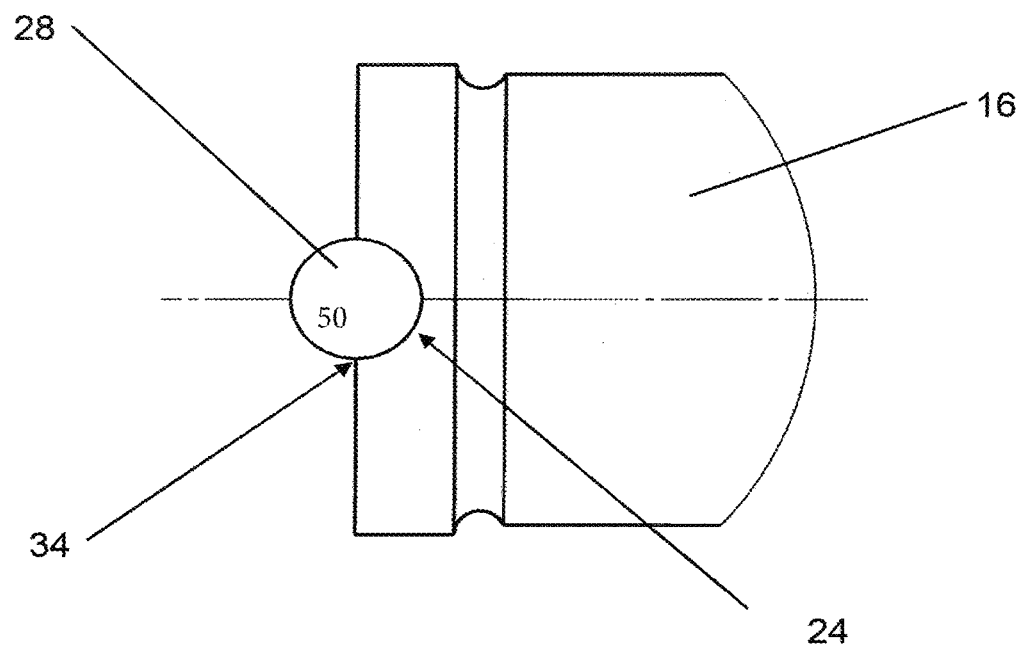
FIG. 3 is a close-up side-on view of the prior art drive shaft of FIG. 2 engaged with a connector pin.

FIGS. 1 to 3 illustrate the parts of a prior art perforator design similar to the perforator disclosed in U.S. Pat. No. 4,456,010, but with a semi-circular drive shaft slot instead of the square slot of U.S. Pat. No. 4,456,010.

In FIG. 1, the perforator 10 comprises an inner cutting head 12, a hollow outer cutting head 14 arranged coaxially around the inner cutting head, and a drive shaft 16, all rotatable about the same axis of rotation A. The drive shaft has a distal end 15 and a proximal end 17 which is connectable to a hand-held drill housing a motor, for example.

The distal end of the perforator 10 terminates in the distal tip 20 of the inner cutting head, which contacts bone in use, and is shown positioned at the bottom of FIG. 1. The proximal end of the perforator 10 terminates in the proximal portion 17 of the drive shaft, which is shown at the top in FIG. 1.

The inner cutting head 12 is movable along the rotational axis A between two positions: a distal position, in which the inner cutting head is not connected to the drive shaft 16, and a proximal position, in which the inner cutting head 12 is connected to the drive shaft 16. The inner cutting head is biased away from the drive shaft 16 and into the distal position by a spring 18, so that the inner cutting head only moves into the proximal position when the distal tip 20 of the inner cutting head is pressed against a surface, such as bone to be drilled.

When there is no pressure applied to the distal tip 20 of the inner cutting head, the cutting head 12 and the drive shaft 16 are disconnected, and neither of the inner or outer cutting heads 12, 14 rotates even when the drive shaft 16 is rotating. A cylindrical housing 22 is arranged coaxially around the outer cutting head 14.

Connection of the inner cutting head and the drive shaft 16 is achieved using a coupling means 50, for example a coupling means comprising a slot-and pin type clutch that comprises a slot 24 (not visible in FIG. 1, as the cross-section is taken along the slot) in the distal end 15 of the drive shaft, and a corresponding connector pin 28 which extends diametrically through the inner cutting head near its proximal end.

The outer cutting head 14 is not translatable along the rotational axis A, and comprises two triangular-shaped openings 30 through which the two opposite ends of the connector pin 28 extend. The triangular openings 30 are arranged so that the apex of each triangular opening 30 points towards the proximal end of the perforator. Thus, translation of the inner cutting head 12 towards the proximal position moves the connector pin 28 towards the apex of the triangular opening 30.

As the distal tip 20 of the inner cutting head 12 is pressed against bone in use, a force is applied which moves the inner cutting head 12 against the biasing spring 18 until the connector pin 28 engages with the slot 24 in the rotating drive shaft 16. In this proximal position, the connector pin 28 also engages with the side or apex of the triangular openings 30, so that rotational force is transmitted from the inner cutting head 12 to the outer cutting head 14, and both cutting heads rotate together. As long as force is applied to the tip 20 of the inner cutting head to keep the connector pin 28 engaged with the slot 24, the rotating drive shaft transmits rotational force to the cutting heads so that both cutting heads rotate and the perforator drills through the bone. As soon as the distal tip 20 of the inner cutting head perforates the bone (for example the inner surface of the cranium), however, the force longer applied to the inner cutting head by the bone is greatly reduced, so the biasing spring 18 urges the pin 28 out of the slot 24 in the drive shaft. Both the inner and outer cutting heads should then cease to rotate immediately, to prevent damage to the dura mater.

As illustrated in FIGS. 2 and 3, the slot 24 in this prior art design takes the form of a semi-circular groove or slot 24 in the flat distal end surface 36 of the drive shaft, where the radius of the groove is chosen to be a perfect fit for the cylindrical connector pin 28. This was intended to have the advantage of providing a close fit for the pin 28 once it is located in the groove, and supporting the connector pin across a large contact area to hold the pin as the drive shaft 16 rotates. In this design, the entire surface of the semi-circular groove is in contact with the pin, around half of the connector pin's circumference, so the trailing half of the slot acts as a drive surface that transmits rotational force to the connector pin. In this design the drive surface therefore takes the form of a quarter-cylindrical surface 32 that abuts the connector pin 28 over a quarter of the pin's circumference.

The present inventors have found, however, that in this prior art design it cannot be guaranteed that the connector pin always separates from the groove in time. Occasionally the pin can get stuck at the sharp 90° edge 34 of the slot when it is released. This can cause damage to the pin or the groove edge, which is disadvantageous for further drilling and in the worst case can result in the coupling not being released in time. This sharp edge of the groove therefore means that it is difficult to ensure safe uncoupling of the driver portion from the cutting portions. Furthermore, the narrow shape of the semi-circular groove delays engagement at the start of drilling. As the groove 24 extends diametrically across the distal end of the drive shaft 16, the coupling can only take place at 0° or 180°. Only with increasing axial pressure does the pin 28 engage in the groove 24 of the drive shaft, by which time the drive has already picked up speed. Coupling in this form has two disadvantages: (i) the user feels an unpleasant chattering as the connector engages the drive shaft; and (ii) the release mechanism can be damaged at the start of drilling as the pin 28 passes over the sharp groove edge 34.

Figure 4:
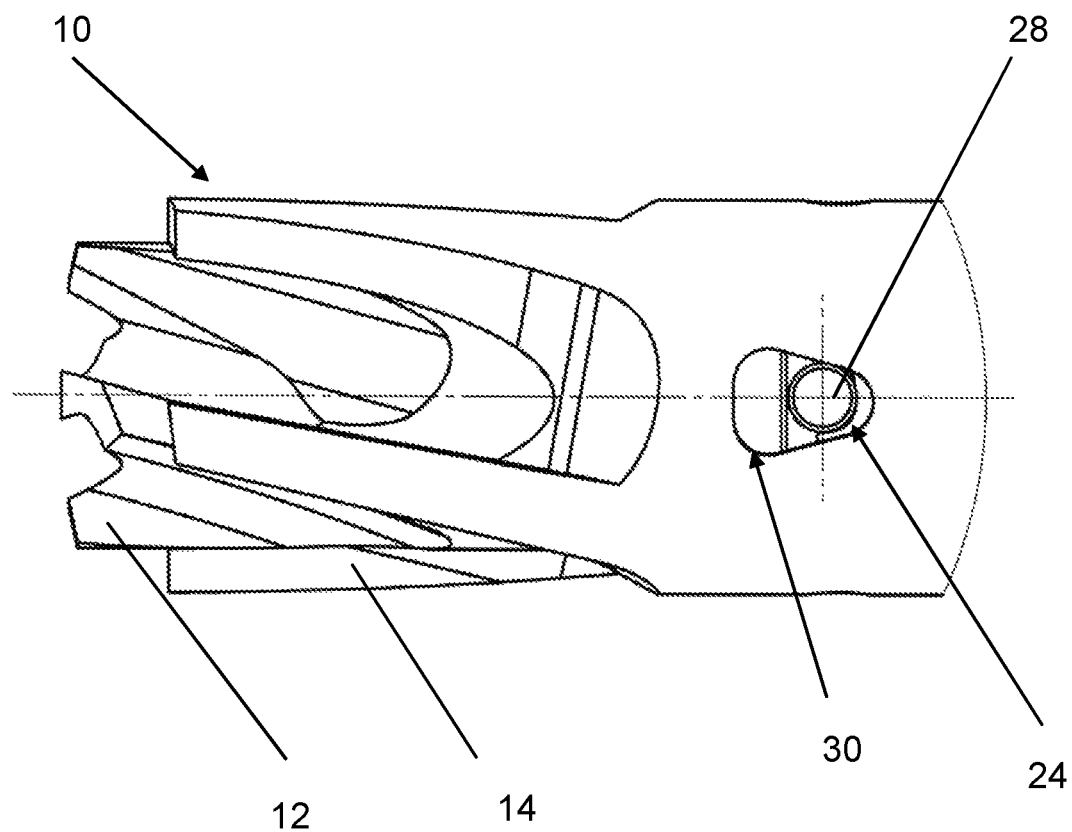
FIG. 4 is a semi-transparent view of an assembled prior art perforator without its cylindrical housing in position.
Figure 5A:
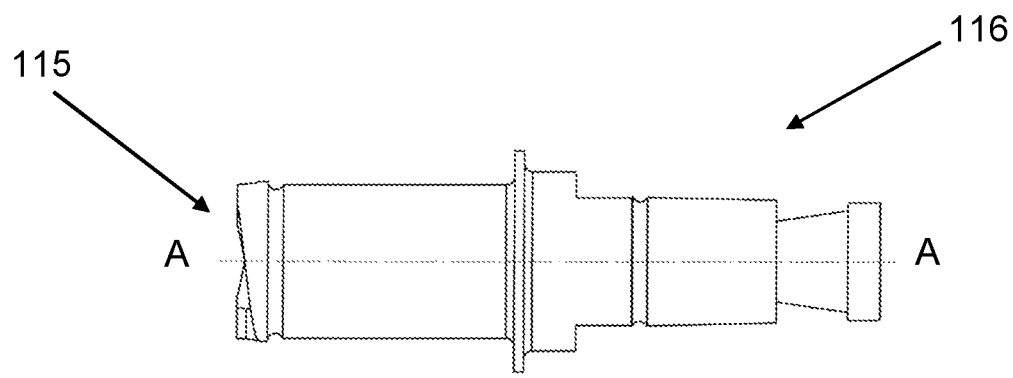
FIG. 5A is a side-on view of a drive shaft of a perforator according to the present invention.
Figure 5B:
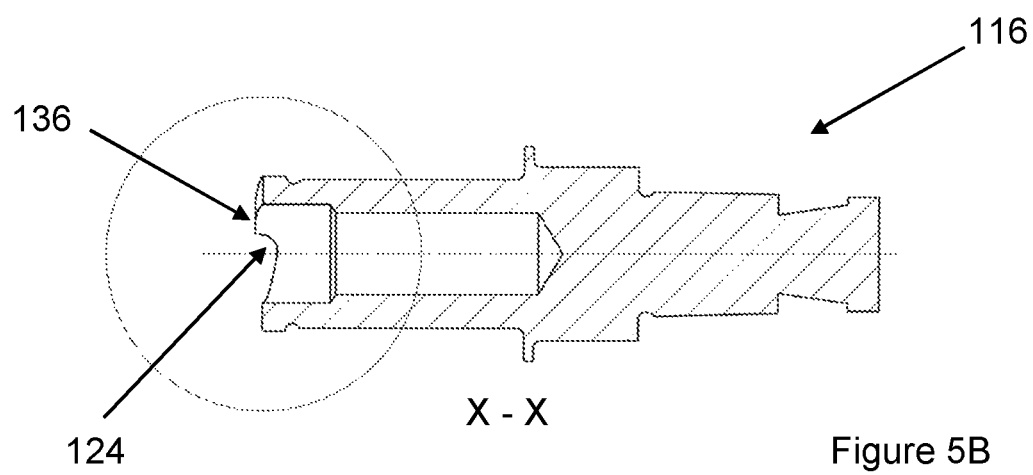
FIG. 5B is a cross-section of the drive shaft of FIG. 5A, taken along the rotational axis A.
Figure 5C:
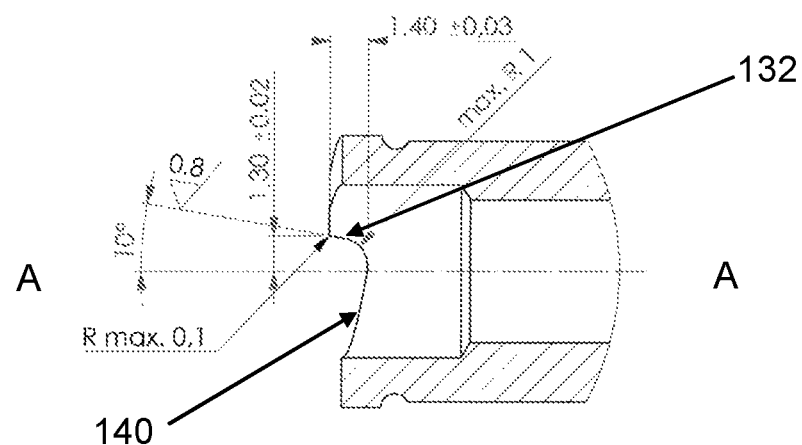
FIG. 5C is an enlarged cross-section of the distal end of the drive shaft of FIG. 5B.
Figure 5D:
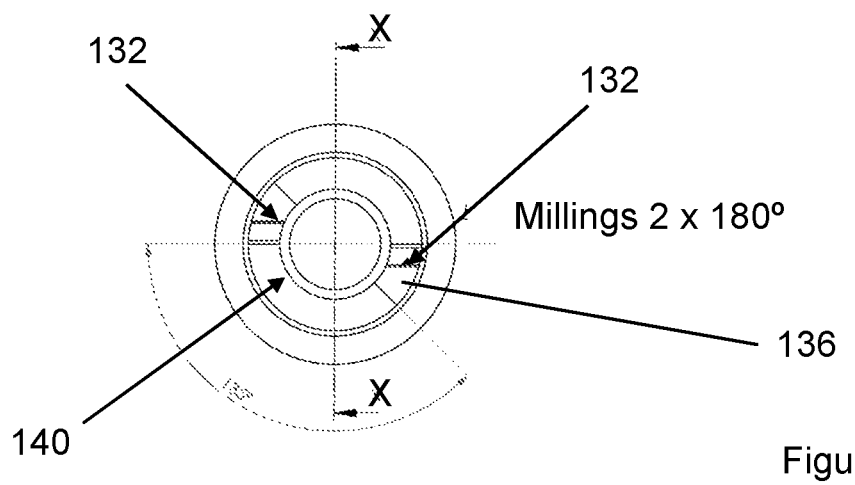
FIG. 5D is an end-on view of the distal end of the drive shaft of FIGS. 5A-5C.
Figure 6:
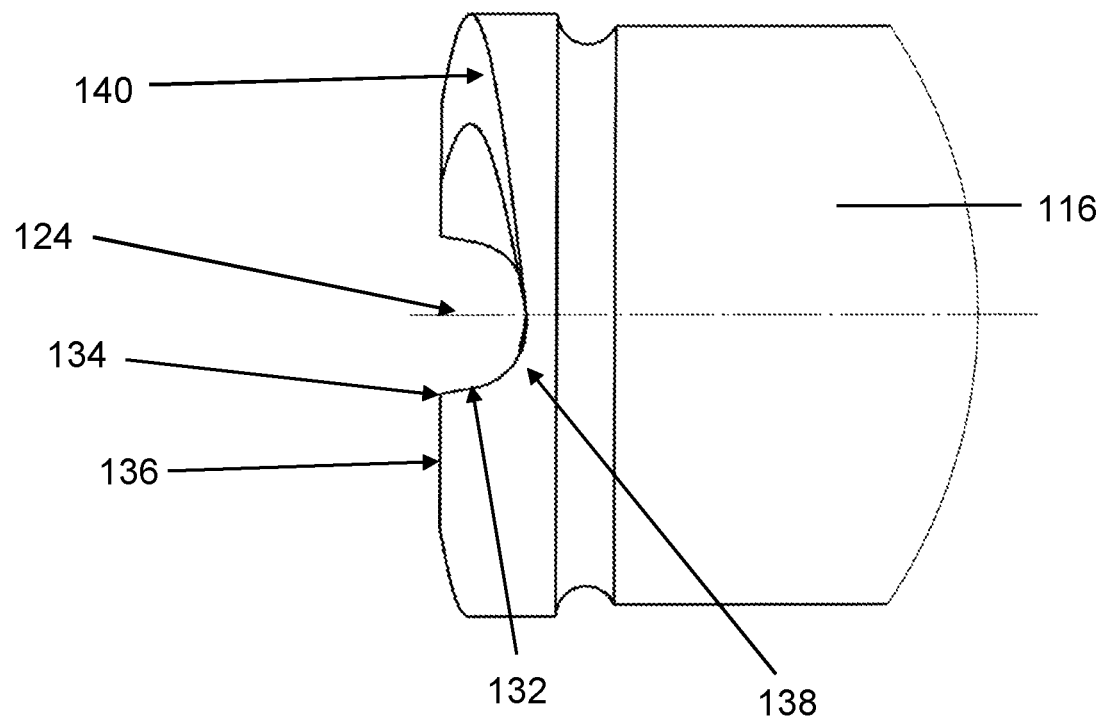
FIG. 6 is a side-on view of the distal end of the drive shaft of a perforator according to the present invention.

FIG. 4 is a semi-transparent view of the perforator 10 in an assembled state with the housing 22 removed, with the connector pin 28 in its proximal position so that the connector pin 28 is located in the semi-circular groove 24. As the drive shaft 16 rotates, rotational motion is transmitted to the connector 28 and the inner cutting head 12 through which the connector pin extends. As the connector pin rotates and contacts the side of the triangular opening 30, the rotational motion is also transmitted to the outer cutting head 14, so that both cutting heads rotate together about the rotational axis A. When the force is removed from the distal tip (not shown in FIG. 4) of the inner cutting head 12, the spring 18 biases the connector pin 28 out of the slot 24 so that the drive shaft 16 no longer drives the inner and outer cutting heads.

FIGS. 5A-5D, 6, 7 and 8 illustrate a drive shaft 116 and a perforator 100 according to a preferred embodiment of the present invention. In this preferred embodiment, the components of the perforator 100 are generally the same as those of perforator 10 described above, apart from the design of the drive shaft 116 and in particular the drive surface 132.

As shown in FIGS. 5A-5D, 6 and 7, instead of a semi-circular groove, in perforator 100 the distal end 115 of the drive shaft 116 comprises two asymmetrical grooves 124 spaced evenly around the circumference of the drive shaft. Each asymmetrical groove 124 has a first sloped side which acts as a drive surface 132 and extends from the flat distal end surface 136 of the drive shaft to the base of the groove 138, and a second sloped side 140 which extends from the base of the groove 138 to the flat distal end surface 136 of the drive shaft at a much shallower angle than that of the drive surface.

The drive surface 132 is positioned on the side of the groove that is the trailing edge when the drive shaft 116 is rotating around the rotational axis A in the desired direction of rotation, so that when the connector pin 128 abuts the drive surface, the drive surface pushes the connector pin around the rotational axis.

The second sloped side 140 of the groove is positioned on the side of the groove that forms the leading edge as the drive shaft rotates. When the drive shaft 116 is rotating and the connector pin 128 is forced into the distal position, the second sloped side 140 therefore acts as a gradual ramped lead-in to the base of the groove 138, increasing the chance of the connector pin locating successfully in the groove 124 immediately.

In the embodiment shown, the second sloped side 140 of the groove 124 extends at an angle of 78° relative to the rotational axis A (or 12° relative to the flat distal end of the drive shaft), and extends an angular distance of 135° around the perimeter of the drive shaft 116.

Unlike the "vertical" slot walls of U.S. Pat. No. 4,456,010, and the semi-circular slot walls of FIGS. 1-3, in the present invention the drive surface is inclined, or sloped, relative to the rotational axis A. In the embodiment shown, the drive surface 132 extends at an angle of 10° relative to the rotational axis A. In other words, the drive surface 132 extends at an angle of 100° relative to the flat distal end 136 of the drive shaft.

Figure 8:
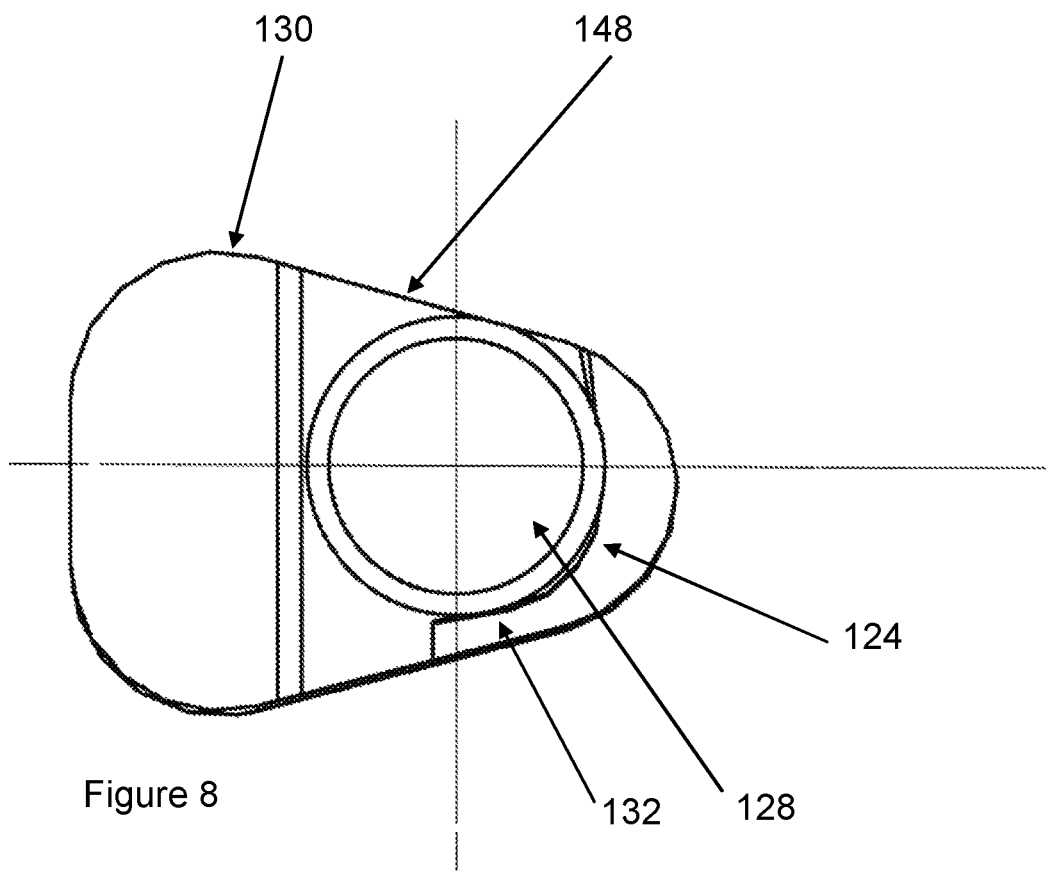
FIG. 8 is an enlarged view of a portion of an assembled perforator according to the present invention, with no housing in position.

The inclined drive surface 132 can take a variety of forms, as shown in FIG. 8, and need necessarily not be flat as long as the drive surface is inclined at the position which abuts the connector. It is particularly preferable for the drive surface to be flat, or at least to have a different curvature from the connector pin, so that the connector pin 128 abuts the drive surface 132 along a single line of contact when the connector pin is in the proximal position.

Figure 9:
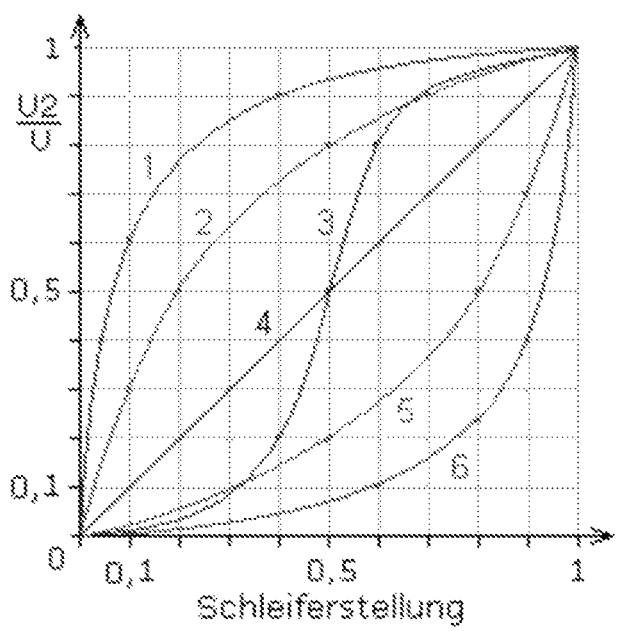
FIG. 9 illustrates a variety of possible drive surface profiles usable in the perforator of the present invention.

As shown in FIG. 9, as long as the portion of the drive surface that abuts and drives the connector is inclined, the profile of the drive surface could take a variety of forms. For example, the drive surface may be flat and inclined, or could follow an exponential curve for example. It would be possible for the profile of the drive surface to be a curve which is very steep on the bottom and therefore provides a good angle for driving the connector pin, but which changes to a flatter curve with increasing height.

The depth of the groove 124, from the flat distal end 136 of the drive shaft to the base of the groove 138 is advantageously greater than the radius R of the connector pin 128, so that the connector pin contacts the inclined drive surface 132 below the edge 134 of the groove. This ensures that the power transmission from the drive shaft 116 to the connector pin 128 always runs through the drive surface, and never along the edge 134. In the embodiment shown, the connector pin contacts the inclined drive surface 0.36 mm proximal to the edge 134.

Figure 7:
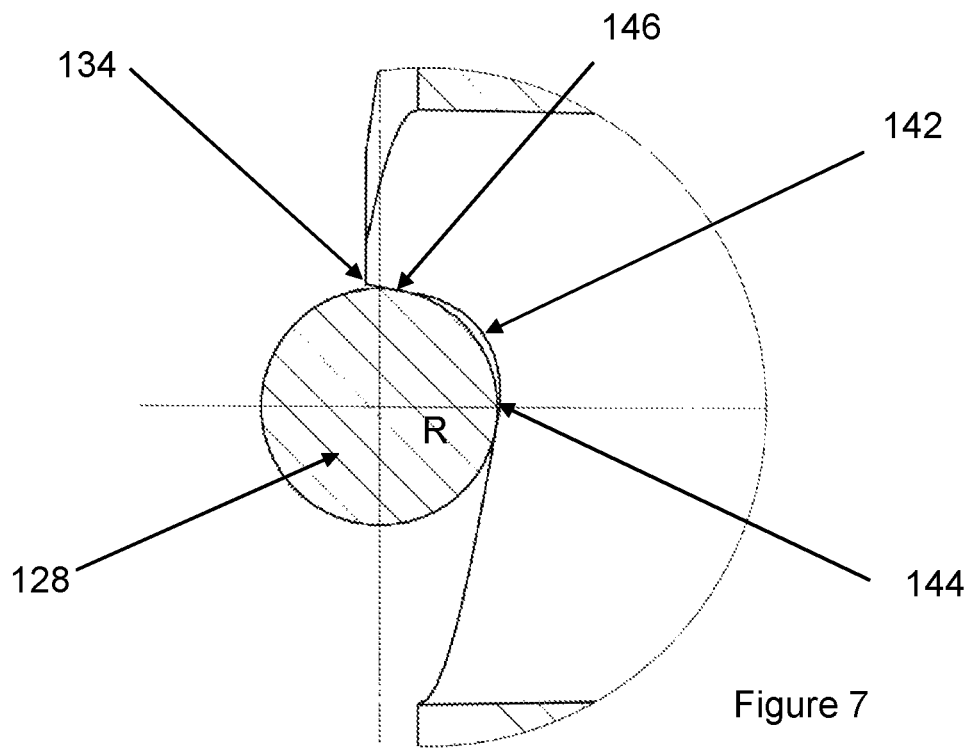
FIG. 7 is a close-up cross-sectional view of the distal end of the drive shaft of FIG. 6 engaged with a connector pin.

At the base of the groove 138, the sloped second side 140 is connected to the drive surface 132 by a continuously curved portion 142 that has a radius of curvature r. The radius of curvature r is selected to be smaller than the radius R of the connector pin 128, which ensures that the connector pin cannot contact the groove over a large contact surface as it does in FIG. 3, for example. In the embodiment shown, the connector pin 128 has a radius R of 1.25 mm, while the radius r of the curved portion 142 of the groove is 1 mm. This difference in radii means that when the connector pin 128 is in the proximal position and located in the groove 124, as shown in FIG. 7, the connector pin 128 only contacts the base of the groove 138 along a first line of contact 144, and the drive surface 132 along a second line of contact 146.

When the force on the distal tip of the inner cutting head 12 is reduced and the connector 128 begins to move towards its distal position, the slope of the drive surface 132 assists this translational motion, as a vector of the rotational force from the drive shaft is transformed into an axial vector which urges the connector towards the distal position. This means that, as the connector disengages, the connector pin 128 slides down the inclined drive surface 132. The connector pin 128 must pass over the edge 134 of the groove to fully disengage, but due to the larger 100° angle of the edge, there is less chance of the connector becoming caught on, or damaged by, this edge during disengagement.

The triangular opening 130 in the outer cutting head 14 also helps with the disengagement of the connector pin 128 from the groove 124, as like the inclined drive shaft, the angled edge 148 of the triangular opening also urges the connector pin in a distal direction. In the present invention, the angle of this angled edge 148 is carefully chosen to be complementary to the angle of the drive surface 132, as together these angles contribute to the release point of the connector pin 128 from the groove 124. In the embodiments shown, the angled edge 148 of the triangular openings 130 extends at 15° relative to the rotational axis A. The 15° angle of the angled edge 148 and the 10° angle of the drive surface therefore gives these two surfaces an effective angular separation of 25°. As the connector pin 128 is pinched between these two surfaces when it is in the proximal position and being driven by the drive shaft, the angular separation of these surfaces determines the vector of rotational force that urges the connector pin in the distal direction, which thus impacts the release point at which the connector will disengage from the groove 124.

The triangular openings may alternatively be provided in different forms, as long as the angled edge 148 is provided. Also, rather than abutting the connector pin 128 itself, a separate coupling pin may be used to interact with the angled edge 148.

In the present invention, the connector pin 128 is formed from a material having a hardness that is equal to the hardness of the drive surface and the angled edge of the coupling means. While prior art connector pins typically had a hardness of 47 HRC, the connector pin 128 in the present invention has a hardness of to 54 HRC, which is the same hardness as the drive shaft and the outer cutting head. This may advantageously ensure that the connector is not easily damaged during engagement and disengagement, and avoid potential problems caused by damage to the connection mechanism. This harder connector pin also allows the use of a 15° angle of the angled edge 148, rather than a larger angle, as the harder connector pin grinds less against the angled surface and therefore slides more smoothly despite the steep angled edge.

The invention claimed is:

1. A perforator for drilling bone tissue, comprising:
   a drive shaft with a rotational axis A;
   an inner cutting head with the same rotational axis A;
   a drive surface provided on the drive shaft; and
   a connector provided on the inner cutting head;
   in which the inner cutting head is displaceable with respect to the drive shaft along the rotational axis between a distal position in which the inner cutting head is not driveable by the drive shaft, and a proximal position, in which the drive surface abuts the connector to transmit rotational motion from the drive shaft to the inner cutting head,
   in which the drive surface is inclined relative to the rotational axis A,
   in which the connector comprises a curved surface, having a radius of curvature r, configured to about the drive surface when the inner cutting head is in the proximal position, so that the curved surface contacts the inclined drive surface along a single line of contact.

2. The perforator according to claim 1, in which the drive surface is flat and inclined relative to the rotational axis A.

3. The perforator according to claim 1, in which a sloped drive surface extends radially outwards from the rotational axis A, such that the drive surface lies on a virtual helical surface extending around the rotational axis A.

4. The perforator according to claim 1, in which the drive surface is sloped at an angle of between 5° and 30°, preferably between 8° and 20°, particularly preferably between 10° and 15° with respect to the rotational axis A.

5. The perforator according to claim 1, in which a distal end surface of the drive shaft is flat, the drive surface being configured so that the angle between the distal end surface and the drive surface is greater than 90°, preferably at least 95°, particularly preferably 100° or more, for example 105° or 110°.

6. The perforator according to claim 1, in which the connector is configured to engage with the drive surface by abutting the drive surface along a single line of contact when the inner cutting head is in the proximal position; in which the connector and the drive surface are configured so that the line of contact is spaced from the distal end of the drive surface, preferably in which the line of contact is spaced at least 0.2 mm, or 0.3 mm, or 0.4 mm from the distal end of the drive shaft.

7. The perforator according to claim 1, in which the connector is a pin, preferably a cylindrical pin having a radius R.

8. The perforator according to claim 1, in which the drive surface has a length that is greater than the radius of curvature R of the connector, so that when the connector is in the proximal position the line of contact between the connector and the drive surface is spaced from the distal end of drive shaft.

9. The perforator according to claim 1, in which the drive surface forms a first sloped side of a groove formed radially in the distal end of the drive shaft, and in which the second side of the groove is sloped in the opposite direction relative to the rotational axis A; in which the second side of the groove is sloped at a greater angle than the drive surface, relative to the rotational axis A.

10. The perforator according to claim 9, in which the second side of the groove is sloped at an angle of between 45° and 85°, preferably between 60° and 80°, particularly preferably between 70° and 80° with respect to the rotational axis A.

11. The perforator according to claim 9, in which the sloped second side of the groove extends over an angular distance of between 30° and 156° around a circumference of the drive shaft, preferably between 110° and 156°, particularly preferably between 130° and 156° around the circumference of the drive shaft.

12. The perforator according to claim 9, in which the drive surface is configured so that the second side of the groove is connected to the drive surface by a continuously curved section with the radius of curvature r; in which the radius of curvature r is smaller than a radius R of the connector surface, so when the connector is engaged with the groove, a proximal portion of the connector abuts the base of the groove at a first contact point to prevent further proximal translation of the connector, and a side portion of the connector abuts the drive surface at a line of contact through which rotational force is transmitted from the drive shaft to the connector; in which the radius R of the connector surface is between 10% and 35% greater than the radius r of curvature of the groove, preferably between 15% and 30% greater, particularly preferably between 20% and 25% greater.

13. The perforator according to claim 1, in which the perforator comprises an outer cutting head arranged coaxially around the inner cutting head; and in which a coupling means is provided between the inner cutting head and the outer cutting head, the outer cutting head comprising an outer coupling portion configured to couple with an inner coupling portion provided on the inner cutting head when the inner cutting head is in the proximal position, so that rotational motion is transmitted from the inner cutting head to the outer cutting head, wherein the coupling means is configured to transform relative rotation of the inner and outer cutting heads around the rotational axis A into translational displacement of the inner cutting head along the rotational axis.

14. The perforator according to claim 13, in which one of the inner or outer coupling portions comprises an angled edge configured to transform relative rotation of the inner and outer cutting heads into translational displacement of the inner cutting head along the rotational axis; in which the inner coupling portion is a pin, and the outer coupling portion is a groove or opening in a wall of the outer cutting head, the groove or opening having a proximal end for receiving the pin in its proximal position and an angled edge for guiding the pin towards its distal position in response to relative rotation of the inner and outer cutting heads.

15. The perforator according to claim 14, in which the angled edge has an angle of between 10° and 45°, preferably between 15° and 30° with respect to the rotational axis A.

16. The perforator according to claim 14, in which the drive surface is inclined at an angle of between 5° and 15°, preferably 10°, relative to the rotational axis A, and the angled edge of the outer coupling portion is inclined in the opposite direction to the drive surface and has an angle of between 10° and 30° relative to the rotational axis.

17. The perforator according to claim 14, in which an angular separation of the drive surface and the angled edge of the outer coupling portion is between 15° and 60°, preferably between 20° and 40°, particularly preferably between 25° and 30°.

18. The perforator according to claim 13, in which the inner coupling portion is the connector, the connector comprising a cylindrical pin which extends radially out of the inner cutting head.

19. The perforator according to claim 1, in which the connector is formed from a material having a hardness that is equal to or greater than the hardness of the drive surface.

20. A perforator for drilling bone tissue, comprising:
a drive shaft with a rotational axis A;
an inner cutting head with the same rotational axis A;
a drive surface provided on the drive shaft; and
a connector provided on the inner cutting head;
in which the inner cutting head is displaceable with respect to the drive shaft along the rotational axis between a distal position in which the inner cutting head is not driveable by the drive shaft, and a proximal position, in which the drive surface abuts the connector to transmit rotational motion from the drive shaft to the inner cutting head,
in which the drive surface is inclined relative to the rotational axis A,
in which the connector is a pin, preferably a cylindrical pin having a radius R.

21. A perforator for drilling bone tissue, comprising:
a drive shaft with a rotational axis A;
an inner cutting head with the same rotational axis A;
a drive surface provided on the drive shaft; and
a connector provided on the inner cutting head;
in which the inner cutting head is displaceable with respect to the drive shaft along the rotational axis between a distal position in which the inner cutting head is not driveable by the drive shaft, and a proximal position, in which the drive surface abuts the connector to transmit rotational motion from the drive shaft to the inner cutting head,
in which the drive surface is inclined relative to the rotational axis A,
in which the drive surface forms a first sloped side of a groove formed radially in a distal end of the drive shaft, and in which the second side of the groove is sloped in the opposite direction relative to the rotational axis A.

22. A perforator for drilling bone tissue, comprising:
a drive shaft with a rotational axis A;
an inner cutting head with the same rotational axis A;
a drive surface provided on the drive shaft; and
a connector provided on the inner cutting head;
in which the inner cutting head is displaceable with respect to the drive shaft along the rotational axis between a distal position in which the inner cutting head is not driveable by the drive shaft, and a proximal position, in which the drive surface abuts the connector to transmit rotational motion from the drive shaft to the inner cutting head,
in which the drive surface is inclined relative to the rotational axis A,
in which the perforator comprises an outer cutting head arranged coaxially around the inner cutting head; and in which a coupling means is provided between the inner cutting head and the outer cutting head, the outer cutting head comprising an outer coupling portion configured to couple with an inner coupling portion provided on the inner cutting head when the inner cutting head is in the proximal position, so that rotational motion is transmitted from the inner cutting head to the outer cutting head, wherein the coupling means is configured to transform relative rotation of the inner and outer cutting heads around the rotational axis A into translational displacement of the inner cutting head along the rotational axis.

* * * * *